T. L. BURTON.
BRAKE BEAM SUSPENSION.
APPLICATION FILED MAY 15, 1920.
1,389,121.
Patented Aug. 30, 1921.
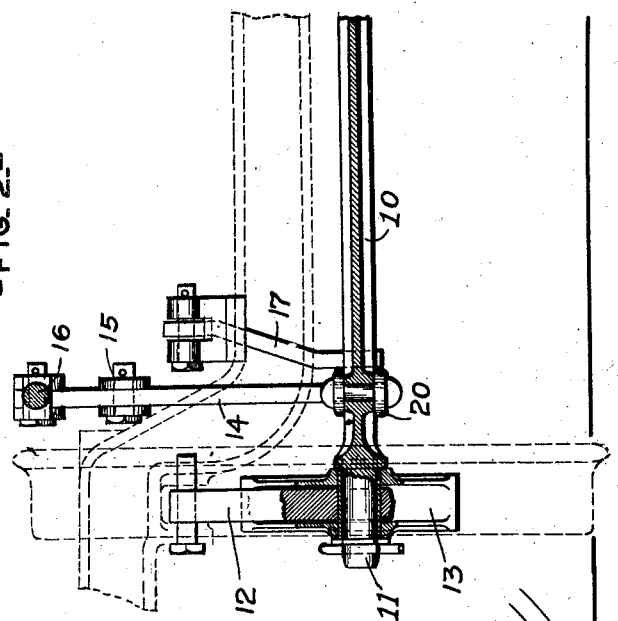
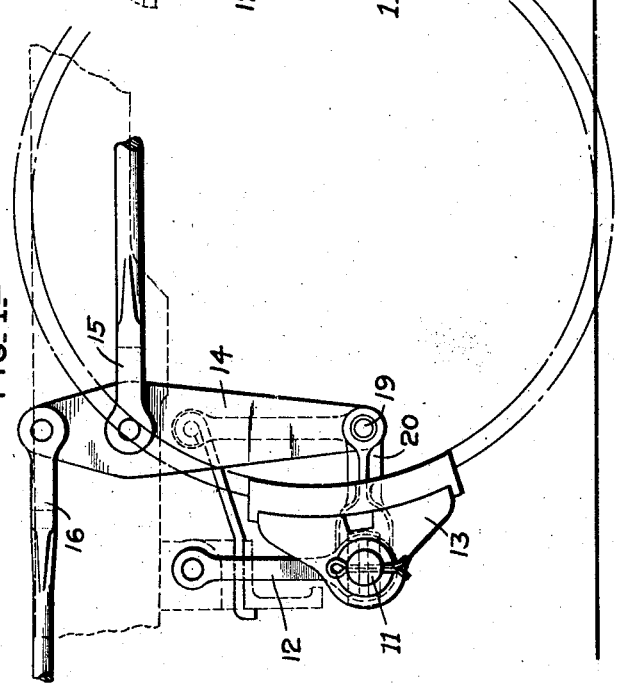
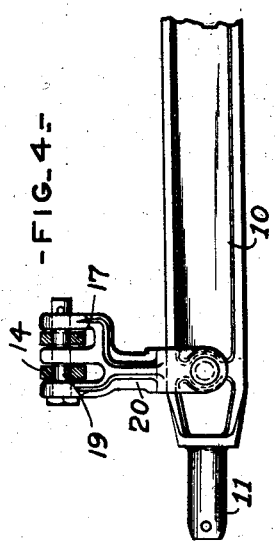
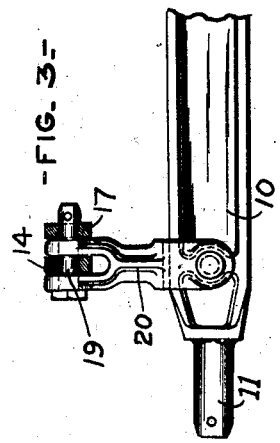
INVENTOR
Thomas L. Burton
BY
Edward Wright
ATTORNEY

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE-BEAM SUSPENSION.

1,389,121.   Specification of Letters Patent.   Patented Aug. 30, 1921.

Original application filed May 18, 1917, Serial No. 169,408. Divided and this application filed May 15, 1920. Serial No. 381,542.

*To all whom it may concern:*

Be it known that I, THOMAS L. BURTON, a citizen of the United States, residing at St. Louis, in the State of Missouri, have invented a certain new and useful Improvement in Brake-Beam Suspensions, of which improvement the following is a specification.

This invention relates to suspension means for brake beams for railway cars, and more particularly to that form of brake beam in which the brake shoes are pivoted upon trunnions at the opposite ends of the beam, one of the objects being to provide improved means for maintaining the beam in a substantially parallel relation as the brake beam and shoe are moved toward the wheel in the application movement, and away from the same during the release action, whereby the shoe will remain substantially concentric to the wheel under the various conditions of wear of the brake shoe and the wheel.

This application is a division of my prior application Serial No. 169,408, filed May 18, 1917.

In the accompanying drawing: Figure 1 is a side elevation of a brake beam suspension embodying my improvement; Fig. 2, an end view of the same, with the brake beam shown in longitudinal section; Fig. 3, a detail view, in plan, showing one form of jaw and its connections with the hanger and the truck lever; and, Fig. 4, a similar view showing a modified form of jaw.

As shown in the drawing, a brake beam, 10, having trunnions, 11, at its ends, is suspended by means of the usual hangers, 12, pivotally connected to the truck frame and to the trunnions of the brake beam. The brake heads, 13, are also preferably pivotally mounted on said trunnions.

Where the usual type of clasp brake rigging is employed, with two sets of truck levers and rods, one on each side of the truck, such as truck levers, 14, and rods, 15 and 16, which parts are duplicated at each side of each pair of wheels, the brake beams are provided with rigidly connected jaws, 20, for pivotal connection with the lower ends of said truck levers, as will be readily understood.

In accordance with my improvement, an additional swinging hanger is provided for the brake beam, said hanger being pivoted at its upper end to the truck frame, and pivoted at its lower end to the jaw, 20, of the brake beam.

The additional hanger is shown in the form of a link, 17, pivoted to the frame, and also to the connecting pin, 19, between the bottom of the truck lever, 14, and the jaw, 20, which may be single, as shown in Fig. 3, or double, as shown in Fig. 4.

With the additional hanger connection for the jaw at each end of the brake beam, it will be seen that the beam will be prevented from tipping downward, and will be maintained in a substantially parallel relation during its application movement in bringing the brake shoes up to the wheels, and its release or backward movement from the wheels, and also that the brake shoes will be maintained substantially concentric with the wheels under the various conditions of wear of the shoe and the wheel.

Having now described my invention, what I claim as new and desire to secure by Letters Patent is:

1. In a brake device, the combination of a brake beam having jaws near its opposite ends, hangers for said beam, truck brake levers pivotally attached to said jaws, and additional hangers pivotally supported on the truck frame and connected to said jaws.

2. In a brake device, the combination of a brake beam having trunnions at its opposite ends, brake heads and hangers pivotally mounted on said trunnions, jaws on said brake beam, truck brake levers pivotally connected to said jaws, and additional hangers pivotally supported on the truck frame and also connected to said jaws.

3. In a brake device, the combination of a brake beam having jaws near its opposite ends, hangers for said beam, truck brake levers pivotally attached to said jaws, and additional hangers pivotally supported on the truck frame and connected to the same pivot with the brake levers on said jaws.

4. In brake mechanism, the combination of a brake beam, a member connected at one end to said beam and at its other end having two jaws, a brake lever mounted in one of said jaws, and a supporting hanger mounted in the other of said jaws.

5. In brake mechanism, the combination of a brake beam, a member secured at one end to said brake beam, and at the other end having two jaws, a brake lever mounted in one of said jaws, a supporting hanger mounted in the other of said jaws, and a single pin passing through said jaws, brake lever and hanger, whereby the brake mechanism is held in a suspended position.

In testimony whereof I have hereunto set my hand.

THOMAS L. BURTON.